Figure 1:
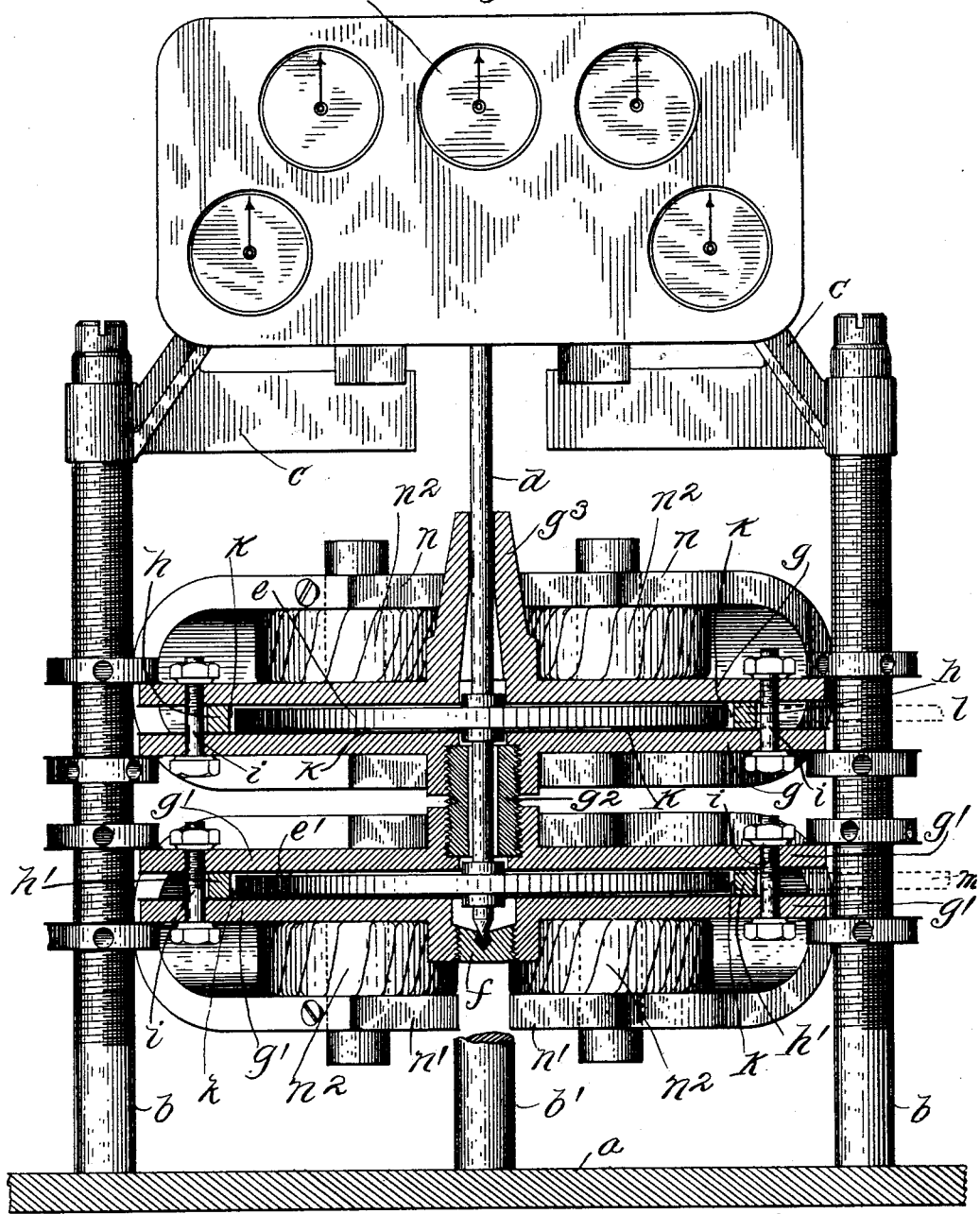

(No Model.) 2 Sheets—Sheet 1.

G. A. SCHEEFFER.
ELECTRIC METER.

No. 591,641. Patented Oct. 12, 1897.

Witnesses:
D. W. C. Garner.
A. D. Lawrence.

Inventor:
Gustave A. Scheeffer,
By Barton + Brown
Attorneys.

UNITED STATES PATENT OFFICE.

GUSTAVE A. SCHEEFFER, OF PEORIA, ILLINOIS.

ELECTRIC METER.

SPECIFICATION forming part of Letters Patent No. 591,641, dated October 12, 1897.

Application filed December 9, 1896. Serial No. 614,998. (No model.)

*To all whom it may concern:*

Be it known that I, GUSTAVE A. SCHEEFFER, a citizen of the United States, residing at Peoria, in the county of Peoria and State of Illinois, have invented a certain new and useful Improvement in Electric Meters, (Case No. 5,) of which the following is a full, clear, concise, and exact description, reference being had to the accompanying drawings, forming a part of this specification.

My invention relates to electric meters, the object of my said invention being the provision of a meter adapted to the continuous and accurate measurement of current, even under the varying and oftentimes trying conditions existent in commercial circuits. I have endeavored, therefore, to overcome certain objections hitherto met with in the structure and operation of electric meters, whereby with my simplified and improved construction I am enabled to insure greater accuracy in the continued operation of the meter than has been previously attained by the employment of any other current-measuring device with which I am conversant.

My invention further contemplates means for securing greater delicacy in the actuation of the meter and a novel method of supplying current to the armature, whereby brushes and commutator-segments are dispensed with without involving attendant disadvantages.

In all forms of electric meter employing rotating armatures hitherto in common use it has been found necessary to use brushes and commutator-bars for supplying current to said armature, and these have always proven a constant source of error in the accurate measurement of current during any extended period of time. It has been found practically impossible to eliminate the error which an alteration in the resistance at the commutator involves, and although many attempts have been made to overcome this serious objection the result has been merely the minimizing of such variation. I have accordingly departed from the commonly-accepted lines of meter construction, and by adapting the mercury contact in a novel manner to the present purposes and entirely discarding the conventional brushes and commutator-segments I have avoided the disadvantages above mentioned.

The electric meter herewith shown embodying my invention may be described in general terms as consisting of a disk armature maintained in contact with a body of conducting medium through which current is directly supplied to said armature and coils generating a magnetic field to which the currents traversing the armature are subjected, thereby causing the rotation of the armature and actuating a registering train connected therewith. The conducting medium, preferably a body of mercury, is maintained in a closed chamber, which prevents any variation in the resistance of the armature-circuit. This meter is based upon the principle that a conductor when placed in a certain position in a magnetic field is urged to a new position in or entirely out of said field immediately any current is passed through the conductor.

I will describe my invention more particularly by reference to the accompanying drawings, in which—

Figure 2:
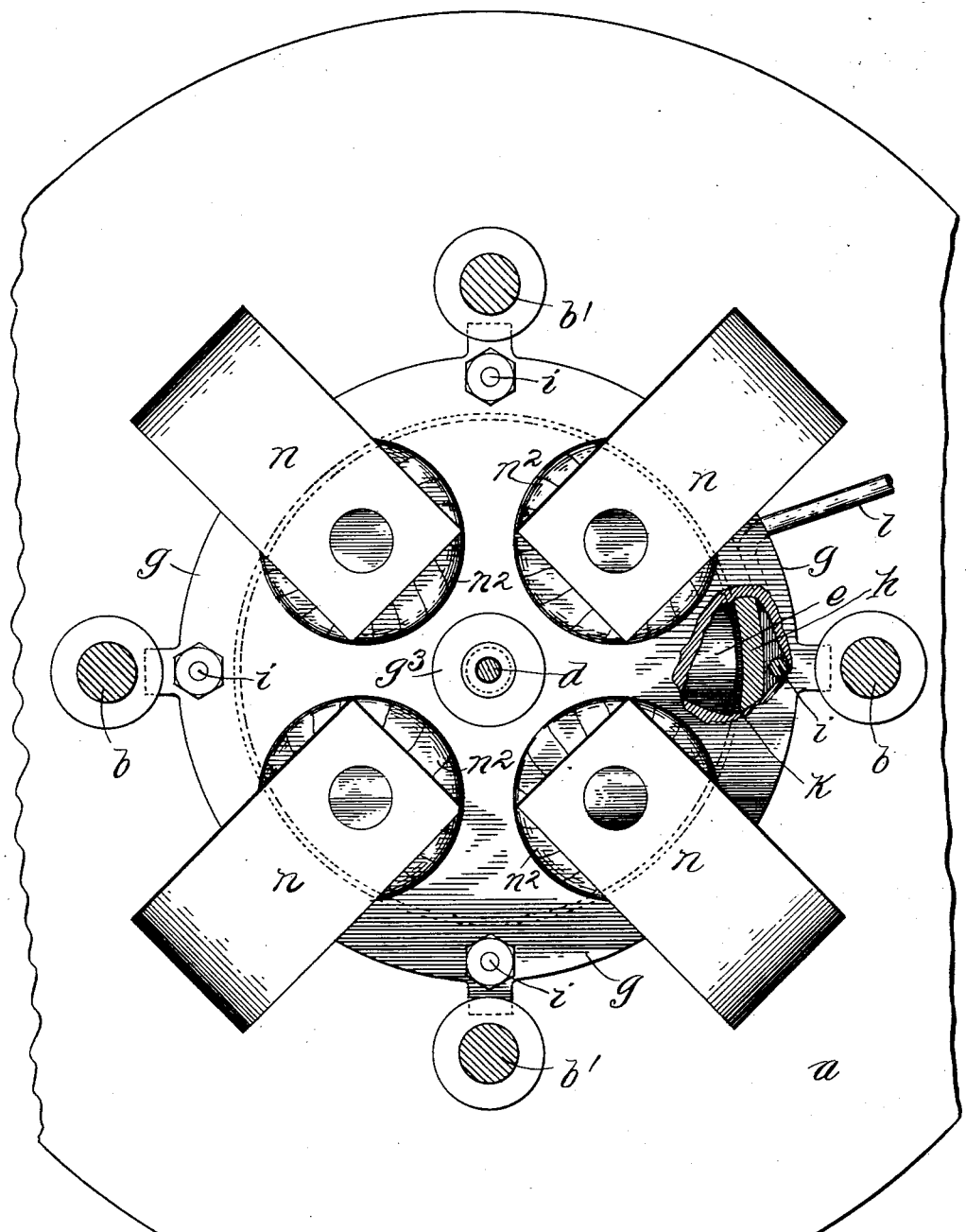

Figure 1 is a front elevation, partially in section, of a meter embodying my invention; and Fig. 2 is a plan view, likewise shown partially in section.

Like parts are designated by the same reference-letters in both of said figures.

Upon the base $a$ are mounted uprights $b$ $b$ $b'$ $b'$, which support upon their upper ends a frame $c$ and registering train $d'$. This train is of the usual construction and is actuated by the shaft $d$, whereon the armature-disks $e$ $e'$ are mounted, said disks preferably being constructed of aluminium and mounted upon the shaft $d$ in such manner as to insure perfect electrical connection between the parts. A short distance below the registering train the uprights support the iron disks $g$ $g$ $g'$ $g'$, which are centrally bored and threaded to receive the plug $f$ and bushing $g^2$, through which the shaft $d$ passes. The top disk $g$ is provided with an upward extension or neck $g^3$, closely surrounding the shaft, while between the disks $g$ $g$ and $g'$ $g'$ are provided the annular walls $h$ $h'$. The iron disks and meter parts are electrically insulated from one another in a manner well known to those skilled in the art. The said disks $g$ $g$ and $g'$ $g'$ are securely fastened together by bolts $i$, forming thereby the closed armature-chamber $k$, in which is contained the conducting medium above mentioned. As previously stated, I preferably employ mercury for this purpose, although other substances might be used in lieu thereof to perform the same functions. The shaft $d$ and the exterior of the disks $e\ e'$, except their edges, are covered with several coats of shellac, which serve to thoroughly insulate the portions covered and direct any flow of current diametrically through the said disks. The circuit-terminals which in the present instance form the series connections of the meter are shown at $l\ m$. The chamber $k$ being filled with mercury, it will be seen that current flowing in the measured circuit necessarily must pass from terminal $l$ to wall $h$ to the mercury, thence to the edge of disk $e$ through shaft $d$, disk $e'$ to its edge, and thence through the mercury to wall $h'$ and terminal $m$.

By constructing the parts so that there is a low-resistance path for the current, as above indicated, while the mercury occupying the narrow spaces between the disks $e\ e'$ and $g\ g$ $g'\ g'$ affords paths of comparatively high resistance, all but a very small portion of the said current necessarily flows through the armatures.

Mounted upon the disks $g\ g\ g'\ g'$ are the eight U-shaped electromagnets $n$ and $n'$, which are provided with helices $n^2$, mounted upon pole-pieces inserted in the outer limbs of said electromagnets. The said helices are connected in a branch across the mains of the measured circuit and supply the magnetic fields wherein the disk armatures rotate. It will be seen that any current passing through the armatures will be subjected to the influences of the fields thus produced, and thereby cause the rotation of said armature at a speed proportional to the current flowing in the measured circuit. A further purpose served by this arrangement of the disks $e\ e'$ and the magnetic fields produced in my improved form of meter is that of a damping device, whereby said meter is materially simplified in construction. By reason of its high specific gravity the mercury within the armature-chamber $k$ in result greatly decreases the weight of the rotating parts, which contributes to the sensitiveness of my meter, whereby a small flow of current in the measured circuit is accurately registered. I preferably adjust the weight of said rotating parts so that the floating effect of the mercury is but slightly overcome. Hence jeweled bearings are in no wise required to insure the accurate measurement of current. By experiment I have proven that this form of meter will start readily and accurately measure the current consumed by a single sixteen-candle-power incandescent lamp, the mercury being completely inclosed in the chamber $k$, so that it is unsubjected to the influence of the atmosphere, and sparking being impossible in the device no change can occur in the resistance of the series connection or, in other words, the armature circuit, whereby the beneficial results sought to be accomplished are obtained. Magnetic fields are vertically projected through the armature-chamber to which the current flowing from the measured circuit is subjected, said current passing from the upper circuit-terminal through the mercury to the circumference of disk $e$, radially through said disk down the shaft, and radially through disk $e'$ to its circumference, and thence through the mercury to the opposite circuit-terminal. The disk armatures are urged to move in a direction at right angles to the lines of force of the field, the direction of the current being radial, and the lines of force passing vertically through the disks the same will rotate in a right-handed direction as viewed in Fig. 2, the force with which the said disks are urged to rotate being proportionate to the strength of the current flowing therethrough.

Obviously alterations may be made in the construction herewith shown without departing from the spirit of my invention; but, Having now shown and described one form of electric meter embodying the features of my invention, I claim, and desire to secure by these Letters Patent, together with such modifications as may be made by mere skill and with only such limitations expressed or by law implied in view of the related arts, the following:

1. The combination with circuit-terminals, of a fluid conducting medium connected therewith, a closed chamber or receptacle for said medium, armatures $e\ e'$ maintained in electrical contact with said conducting medium, and means for directing the greater portion of the current flowing between said terminals through the armatures in series, substantially as described.

2. The combination, in an electric meter, with a body of fluid conducting medium connected with the measured circuit, of armatures $e\ e'$ maintained in electrical contact with said medium, means for directing current from the conducting medium through the armatures substantially in radial directions, and fields before which said armatures are mounted adapted to impart movement to the armatures when current is directed through the same, substantially as described.

3. The combination with circuit-terminals of a body of fluid conducting medium connected therewith, a closed chamber or receptacle containing said medium, rotatable conductors $e\ e'$ maintained in electrical contact with said body of conducting medium, and means for directing the greater portion of the current flowing between said terminals through the said rotatable conductors, substantially as described.

4. In an electric meter, the combination with terminals connected with the measured circuit, of a body of fluid conducting medium electrically connected therewith, armatures $e\ e'$ immersed in said medium, means for directing current from the conducting medium through the said armatures substantially in radial directions, helices connected with the measured circuit and adapted to supply magnetic fields in which the armatures are rotatably mounted, whereby a torque is imparted to the same and a damping effect is obtained, and means for registering the rotation of the armature, substantially as described.

5. The combination in an electric meter, with terminals connected in series with the measured circuit, of a body of fluid conducting medium electrically connected with said terminals, a closed chamber in which said medium is contained, a registering train, a driving-shaft adapted to actuate the same, disk armatures $e\ e'$ mounted upon said shaft within the closed chamber in electrical connection with the fluid medium, means for directing current from said medium through the armatures in series substantially in radial directions, and magnetic fields within which the armatures are rotatably mounted, whereby a torque is imparted to the driving-shaft during the passage of current through the armatures, substantially as described.

6. In an electric meter, the combination with the fields thereof, of disk armatures $e\ e'$ maintained within said fields, a body of mercury surrounding the armatures in electrical connection with the peripheries thereof, a closed chamber containing the said armatures and body of mercury, terminals connected with the measured circuit in electrical connection with the mercury, means for directing the current flowing in the measured circuit radially through the armatures in series, whereby said current is subjected to the influence of the fields and a torque is imparted to the armatures, and a registering train controlled by the movement of said armatures, substantially as described.

7. The combination with the closed armature-chamber $k$, of disks $e, e'$ rotatably mounted therein, a body of mercury maintained in said chamber in electrical contact with said disks, circuit-terminals connected in series with the measured circuit adapted to supply current to said body of mercury and disks $e, e'$, helices connected in a branch across the mains supplying fields to which the current traversing the disks is subjected and means for registering the rotation of said disks, substantially as described.

8. The combination with the registering train of disks $e, e'$, rotatably mounted to actuate the same, closed armature-chamber $k$ having its walls $g, g, g', g'$, formed of paramagnetic plates or disks electrically insulated from one another, a body of mercury maintained in said chamber in electrical contact with the disks $e, e'$, fields to which the currents traversing the disks are subjected, whereby a torque is imparted to the rotating parts proportional to the flow of current in the measured circuit, and means for registering the rotation of said parts, substantially as described.

9. The combination in an electric meter with the disks $e\ e'$ formed of conducting material and mounted upon the shaft actuating the registering train of said meter, of magnetic fields provided respectively for said disks in which they are rotatably mounted, a body of fluid conducting medium maintained in electric contact with said disks, circuit-terminals connected with the measured circuit and the fluid conducting medium, and means for directing the greater portion of the current flowing between the said terminals through the disks substantially in radial directions, substantially as described.

In witness whereof I hereunto subscribe my name this 30th day of November, A. D. 1896.

GUSTAVE A. SCHEEFFER.

Witnesses:
WILLIAM T. ABBOTT,
LEIGH F. GIBSON.